United States Patent [19]

Schiller

[11] Patent Number: 4,752,966

[45] Date of Patent: Jun. 21, 1988

[54] FINGERPRINT IDENTIFICATION SYSTEM

[75] Inventor: Michael Schiller, Riverside, N.Y.

[73] Assignee: Fingermatrix, Inc., North White Plains, N.Y.

[21] Appl. No.: 894,514

[22] Filed: Aug. 6, 1986

Related U.S. Application Data

[63] Continuation of Ser. No. 477,310, Mar. 21, 1983, abandoned, which is a continuation-in-part of Ser. No. 362,294, Mar. 26, 1982, abandoned.

[51] Int. Cl.$^4$ .............................................. G06K 9/00
[52] U.S. Cl. .......................................................... 382/5
[58] Field of Search .......................... 382/4, 5; 356/71

[56]  References Cited

U.S. PATENT DOCUMENTS

| | | | |
|---|---|---|---|
| 3,537,070 | 10/1970 | Malek | 382/5 |
| 3,558,864 | 1/1971 | French | 382/4 |
| 4,015,240 | 3/1977 | Swonger et al. | 382/5 |
| 4,083,035 | 4/1978 | Riganati et al. | 382/5 |
| 4,135,147 | 1/1979 | Riganati et al. | 382/30 |
| 4,185,270 | 1/1980 | Fischer et al. | 382/5 |
| 4,208,651 | 6/1980 | McMahon | 382/5 |
| 4,210,899 | 7/1980 | Swonger et al. | 382/5 |
| 4,227,805 | 10/1980 | Schiller | 382/5 |
| 4,310,827 | 1/1982 | Asai | 382/5 |

OTHER PUBLICATIONS

Millard, "An Approach to the Automatic Retrieval of Latent Fingerprints", *Proc. of the 1975 Carnahan Conf. on Crime*, Lexington, Ky., May 1975, pp. 45–51.

*Primary Examiner*—Leo H. Boudreau
*Attorney, Agent, or Firm*—McAulay, Fields, Fisher, Goldstein & Nissen

[57] ABSTRACT

An automatic fingerprint enrollment and identification technique is provided for automatically processing an input image represented by pixels having either a one or zero value. The automatic processing involves a series of steps in which the initial processing is a rough screening technique for eliminating a reasonable portion of the noise while passing through almost all of the minutia. As the steps proceed, the processing becomes more complex to provide a tighter screening out of noise while passing through as much of the minutia as possible. The later steps by operating on relatively fewer minutia or anomaly points that the earlier steps can be economical though more complex so as to be more discriminate than the earlier steps. The processing provides an optimum trade off between enrolling as large a proportion of the population as possible while minimizing the number of false identification errors.

24 Claims, 6 Drawing Sheets

CENTER BROKEN RIDGE
FIG.5A

FIG.5B

MODIFIED BRIDGE
FIG.5C

FIG.5D

RIPPLE NOISE
FIG.5E

CRACKS
FIG.5F

CLASSIC BRIDGE
FIG.5G

HOLES
FIG.5H

"KISSING" RIDGES
FIG.5I

CENTRAL HOOK
FIG.6

FINGERPRINT IDENTIFICATION SYSTEM

REFERENCE TO RELATED APPLICATIONS

This application is a continuation of application Ser. No. 477,310, filed 3/21/83, now abandoned, which in turn is a continuation-in-part of Ser. No. 362,294, filed 3/26/82, now abandoned.

BACKGROUND

This invention relates to an apparatus and a method of identifying and classifying the minutia of a fingerprint for the purposes of enrollment to establish a reference file and verification of a subject's identity against his or her reference files.

Fingerprints are uniquely identified by the set of minutia characteristic of the fingerprint. These minutia are two standard elements; line endings and line bifurcations. A fingerprint can be analyzed either in terms of its ridges or its valleys. In either case, there will be endings and bifurcations. Specifically, the ridge analysis of a fingerprint will be in terms of ridge endings and ridge bifurcations while a valley analysis of a fingerprint will be in terms of valley endings and valley bifurcations. Indeed, a valley ending is defined by a ridge bifurcation and a ridge ending is defined by a valley bifurcation.

In this application, it will be convenient to assume a ridge ending and bifurcation analysis and thus all references in this disclosure, unless specifically otherwise indicated, will be to ridge endings and ridge bifurcations. However, it should be understood that the use of the terms line endings and line bifurcations in the claims is generic to both the ridge and valley analysis.

In addition to the line endings and bifurcations there are all sorts of line breaks, bridges and other irregularities in a typical fingerprint which deviate from an ideal conception of a pattern of sworls and lines having only classical minutia (line endings and bifurcations) to characterize the pattern. These other characteristics will be deemed fingerprint noise herein. This fingerprint noise tends to be unstable from one fingerprint scan to another. The classical minutia tends to be stable. But bridges, breaks, ripples, cracks, holes and other characteristics of a given fingerprint tend to disappear and reappear from one finger impression to another. Thus these characteristics, deemed noise herein, are a main reason why it is difficult to use optical or electronic systems, or a combination thereof, for automatic analysis or identification of a fingerprint.

It is a purpose of this invention to provide a technique of efficiently distinguishing between classical minutia and noise.

There are two types of errors which it is the object of this invention into minimize. These errors will be termed herein Type I and Type II errors. For example, in a system used to screen access to a room, a Type I error is one where the individual who is supposed to have access is rejected. A Type II error is one in which an individual who is supposed to be denied access is passed. Thus a Type I error can be considered a false negative and a Type II error can be considered a false positive.

More generally, low Type I errors indicate system sensitivity in that the system is sensitive to the correspondence between an input fingerprint and the corresponding enrolled fingerprint. Thus, in a high percentage of cases, the system will positively identify the individual whose fingerprint is being presented.

Similarily, low Type II errors indicate system specificity in that the identification is specific to the individual involved so that the probability is low that an input fingerprint will be identified as corresponding to an enrolled fingerprint of another individual.

It is a further purpose of this invention to provide a system which will have low Type I errors and low Type II errors in combination with fast verification of an input fingerprint and to do so employing equipment and apparatus having a cost that warrants relatively wide spread use.

It is another purpose of this invention to provide an optimum trade-off between (a) selecting a portion of the fingerprint minutia for use in encoding a fingerprint to minimize the time it takes to complete a verification routine and (b) maintaining enough minutia information in the enrolled file to minimize Type I and Type II errors.

U.S. Pat. No. 4,322,163 is incorporated herein by reference. It discloses a preferred optical scan technique for developing the fingerprint configuration that is processed by the fingerprint identification system of this invention.

BRIEF DESCRIPTION

In brief, the technique of this invention involves a series of steps on an input fingerprint image. The image is derived from an optical scan of the finger or fingerprint and the modulated scan has preferably been mechanically-optically filtered to remove the higher frequency spatial components of the image and thus eliminate some of the noise. The input image is presented as a field of pixels.

In a first phase of the process, a set of templates are scanned across the input image to identify all possible line endings and bifurcations. This identifies most line discontinuities and most line branching. In this fashion, an extensive set of anomalies is initially identified.

In a second phase of the process, a simple geometric analysis is made of a predetermined zone around each identified anomaly. This geometric analysis is directed to the structure of minutia and, in particular, to the fact that on the sides of each good minutia there are substantial zones of the contrasting value. Those anomalies which meet this geometric criteria are passed on as minutia candidates for further processing while the bulk of the anomalies, typically 60% to 80%, are eliminated. This geometric criteria is selected to have a low rejection error although obviously it has a moderately high acceptance error. But it quickly and inexpensively provides a substantial reduction in the number of anomalies so that the subsequent more time consuming and expensive steps will be applied to a substantially reduced number of anomalies.

The third and fourth phases of the process eliminate almost all those minutia candidates which are noise; that is those anomalies which are not classical minutia. The series of steps taken are adapted to automatic processing and, equally important, are an efficient technique for distinguishing between noise and minutia. They are an efficient technique because they address the structure of minutia and noise in a fingerprint. Thus, phase three identifies noisy subfields and quickly eliminates a large portion of the noise while eliminating few of the minutia. Phase four makes a detailed analysis of paired minutia candidates to identify relationships which are typical of the noise structure in a fingerprint.

A fifth phase of the processing identifies the angle of the minutia by comparing each minutia against a series of templates. A skeletal version of the minutias is employed to standardize this comparison.

The above five phases are employed during identification routines and verification routines as well as during the enrollment process.

In enrollment, a sixth phase of the processing involves establishing a reduced file of minutia representing the most stable and repeatable minutia so as to provide a final reference file of minutia no greater than 20 minutia and no less than 7 minutia. Limiting the number of minutia speeds up the verification process.

In this sixth phase of enrollment, the input fingerprint is removed and reapplied a number of times to provide a plurality of scans. After each scan, the minutia determined by the fifth phase of processing is compared with the minutia developed or identified in the initial scan. Based on the frequency of repetition of corresponding minutia, a final reference file is provided consisting of those minutia which are repeated most frequently.

The verification mode of the invention employs, as much as possible, the same steps as are employed in enrollments so that there is substantial congruence between the enrollment mode and the verification mode in order to compensate for any biases due to the processing technique. However, in the verification mode, the sixth phase of processing is a comparison of the input fingerprint image against the final reference file having a relatively limited number minutia.

BRIEF DESCRIPTION OF THE FIGURES

FIG. 3 represents the template as a set of pixels. Each pixel has an on state and an off state (shown as dark and light values) representing presence or absence of a ridge, respectively.

FIG. 4 illustrates the geometric criteria used in the second phase of the fingerprint data processing to screen the anomalies selected in the first phase and provide a set of minutia candidates. The critical geometric criteria employed in this FIG. 4, phase two, processing is the distance from dark line ending pixel C through the opposite value (that is, light) pixels surrounding it to the next light to dark transition zone. This criteria is based on the determination that classical stable minutia are line endings (ridge endings and valley endings) which are surrounded on three sides by a substantial zone of the opposite value. That is, a ridge ending is surrounded on three sides by a substantial valley and a valley ending is surrounded on three sides by a substantial ridge. Unless the anomaly is so surrounded, it is rejected as a minutia candidate.

In FIGS. 5A through 5D and FIG. 5G one of the rejected pair is the minutia candidate under analysis which is represented by the center pixel C. In FIGS. 5E, 5F, 5H and 5I, the anomaly pairs being rejected are near to but do not include the minutia candidate represented by the center pixel C.

DESCRIPTION OF THE PREFERRED EMBODIMENTS

Figure 1:
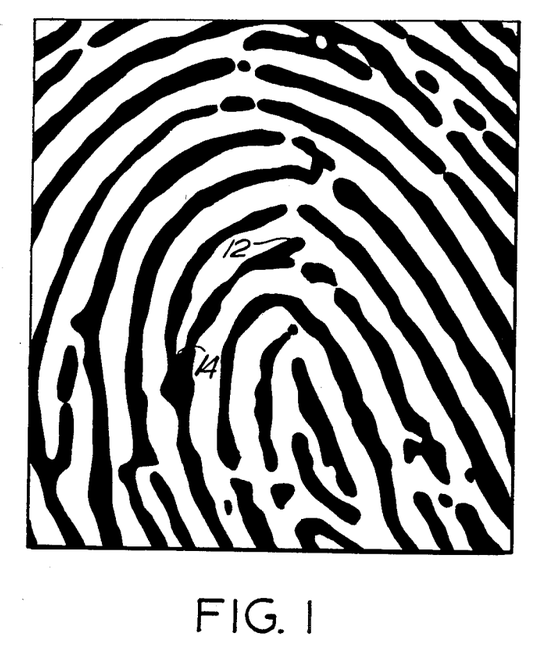
FIG. 1 is a schematic representation of a portion of a fingerprint showing classical minutia; in this case ridge ending and ridge bifurcation minutia.
Figure 2:
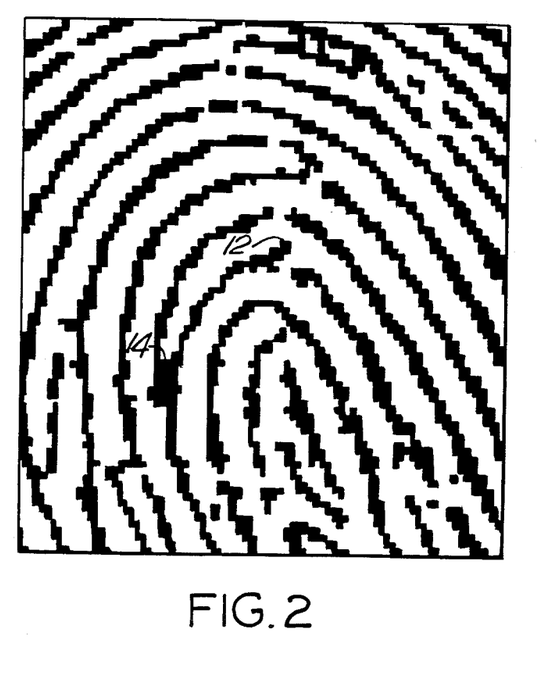
FIG. 2 is a representation of the FIG. 1 fingerprint portion in terms of light and dark pixels as such would be generated by transducer elements employed with the optical scanning technique disclosed in the referenced U.S. Pat. No. 4,322,163.

A typical fingerprint, a portion of which is illustrated in FIG. 1, may be detected or represented in any one of a number of known ways. One such way is illustrated by the optical scanning techniques disclosed in U.S. Pat. No. 4,322,163, which is incorporated herein by reference. This optical scan provides a light beam which is modultaed by the ridges and valleys of the fingerprint. The modulated light beam is applied to an array of charge coupled devices to provide a field of signals each having either a high value or low value representing the fingerprint. The fingerprint is optically scanned to provide a modulated beam. The array may be a line of about two hundred elements which are subjected to the modulated beam and interrogated electronically at a predetermined rate. Thus there is provided in appropriate storage a set of data constituting a field of individual data points or pixels. In one embodiment, this field is 192 by 254 pixels thus providing 48,768 pixels. The portion of the fingerprint shown in FIG. 1 is illustrated in FIG. 2 by a field of pixels.

Each data point is referred to herein as a pixel. Thus there is a set of about 48,000 pixels having either a "one" value or a "zero" value to represent the fingerprint. In general, the term pixel refers to the smallest resolved element in a picture system. In this disclosure, the pixels having a "one" value are represented by small shaded squares and the "zero" value pixels by small blank squares. The shaded pixels can be considered as corresponding to a ridge input and the blank pixels as corresponding to a valley input. The representation could, of course, be reversed. FIGS. 1 and 2 illustrate a typical ridge line ending 12 and a typical ridge bifurcation 14.

This field of pixels is processed in accordance with the following routines in order to identify standard minutia. The minutia constitute the identifying characteristics of the fingerprint for the purposes of initially enrolling the fingerprint as one of a set of fingerprint data in the system or, subsequently, for identifying an input fingerprint as corresponding to one of those enrolled in the system.

TEMPLATE SCREENING

Figure 3:
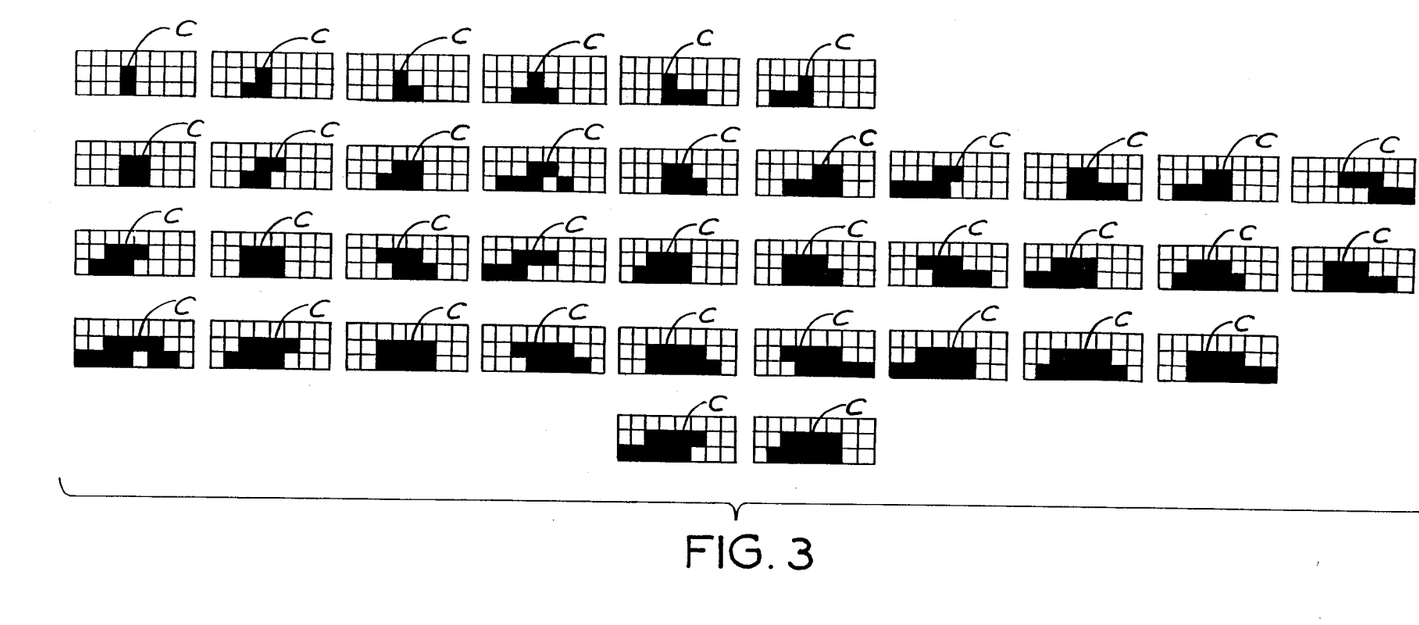
FIG. 3 is a schematic of the set of sub-field templates employed to identify anomalies in a subject fingerprint. This FIG. 3 set of sub-field templates are employed in the first phase of the analysis of the input fingerprint data.

A First Phase Of Processing (FIG. 3)

FIG. 3 represents a series of thirty-seven templates which are used to identify what are somewhat arbitrarily termed herein anomalies in the set of pixels representing the fingerprint. Each of the FIG. 3 templates is a set of $3 \times 8$ pixels having the contrasting values shown.

Those pixels which are shown as dark and those which are shown as light in the drawings herein is a matter of convenience. For example, the ridge lines could be represented by dark pixels or by light pixels as long as the valleys are of the other value.

In any case, each of the thirty-seven templates shown in FIG. 3 is scanned over the fingerprint field and whenever any of these templates matches any sub-field within the field of the fingerprint, that match is identified and the sub-field appropriately tagged as an anomaly. The templates shown tend to identify line endings having an upward direction. In order to pick out line endings having a downward direction, an additional thirty-seven templates are provided corresponding to the FIG. 3 templates rotated 180 degrees.

If we assume that the line endings detected by the seventy four templates represented by FIG. 3 are ridge line endings, then it is also essential to identify ridge bifurcations. Accordingly, the templates shown in FIG. 3 is reversed in pixel value to provide an identical, but reversed field, set of templates. These line bifurcation templates are not only the thirty-seven corresponding to the reverse field of those shown in FIG. 3 but are also an additional thirty-seven congruent to the first thirty-seven except rotated 180 degrees. Thus one hundred forty eight templates are used. This phase one screening tags each anomaly as either a line ending or a line bifurcation.

The one hundred forty eight templates representated by FIG. 3 tend to pick out ridge line endings and ridge bifurcations having upward and downward directions. The anomalies having left and right orientations are picked out by rotating the image 90° and repeating this process. The analysis of the rotated image occurs after all phases of the processing of hte non-rotated image is completed.

Phase one is a very rough screen and may produce in the order of five hundred to one thousand anomalies. This phase one approach looks at a discontinuity criteria and identifies any $3 \times 8$ sub-field which has a discontinuity as an anomaly to be looked at to determine if it is a candidate for a minutia. Because it identifies almost any discontinuity, this rough screen has a very low rejection of correct minutia and a high noise acceptance. But, it provides a simple, quick, and easy to implement screen to establish a set of anomalies for more detailed analysis.

The phase one processing using the type of templates illustrated in FIG. 3 provides information concerning the type of anomaly (line ending or bifurcation), the curvature and thickness of the anomaly, and the relative position of each anomaly in the field being scanned. For example the line ending anomalies in the first row of FIG. 3 are all relatively thin anomalies with a high curvature compared with those in the fourth and fifth rows.

For each of the anomalies identified in this phase one screening, a sub-field center pixel C is selected, on a predetermined basis, as the identifying end point pixel from which further processing, as described below, is undertaken. The center pixel C is either the ($x=4$, $y=2$) or the ($x=5$, $y=2$) pixel. The center pixel C for a line ending is the same center pixel for the complementary line bifurcation.

CONTINUITY TESTING

Figure 4:
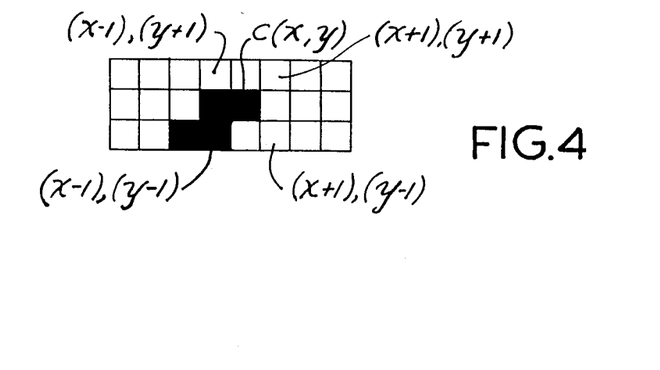
FIG. 4 is a schematic representation of the pixels from a typical anomaly selected from the phase one screening.

A Second Phase Of Processing (FIG. 4)

The second phase of processing is a simple, powerful technique directed to a structural examination in a very small area and eliminates most of the anomalies, therefore providing a set of minutia condidates. Concatenation of phase one and phase two processing may eliminate as much as 80% of the anomalies and thereby produce a set of about two hundred minutia candidates. The phase two approach is based on the observation that stable minutia have substantial adjacent areas of the opposite value. That is, a ridge line ending minutia is a ridge line segment having substantial thickness surrounded on three sides by a valley having substantial thickness. Similarly, a ridge bifurcation is a valley line ending segment of meaningful thickness surrounded on three sides by a ridge having meaningful thickness. Thus, in both cases there is a straight line segment having a particular value and having meaningful thickness for that value which is surrounded on three sides by a zone of the other value having meaningful thickness.

A first part of this second phase is a border edit to eliminate what is essentially an unstable pixel zone along the boundary of the image. All phase one anomolies which have their center pixel C within this border zone are eliminated. In one embodiment in which the image size is initially $192 \times 254$ pixels, with the top of the image being 192 pixels wide, this border zone has a width that is 24 pixels along the bottom, 16 pixels along the left, 8 pxiels along the top and 8 pixels along the right. This reduction of the effective area to be further processed by about twenty percent substantially increases the speed of the process and reduces the rate at which anomolies are erroneously identified as minutia while eliminating very few good useful minutia. The larger zone along the bottom and left is dictated by observation and probably reflects the effects of scan initialization.

Broadly speaking, the center pixel C for each of the anomalies selected from phase one provides a point from which a count is made to a transition zone on a first side of the anomaly and then a count is made to a transition zone on the other side of the anomaly. If the transition zone fails to show a predetermined continuity, then the anomaly is rejected.

More particularly, with reference to FIG. 4, the line ending pixel C may be designated as the pixel (x, y). The pixel $(x+1)$, $(y+1)$ is identified. A count of pixels to the right of $(x+1)$, $(y+1)$ is made to the first light to dark transition zone. That count is designated as L1. A similar count to the right to the first light to dark transition zone from $(x+1)$, $(y-1)$ is made and that number designated as L2. If the absolute value of the difference between L1 and L2 is greater than five, then the anomaly is rejected as a minutia candidate.

A similar test is made by counting pixels to the left to the first light to dark transition zone. A count is made to the left from the pixel $(x-1)$, $(y+1)$ and from the pixel $(x-1)$, $(y-1)$ respectively. Again, if the absolute value of the difference between those two counts is greater than five, the anomaly is rejected.

This test has the advantage of providing a quick technique for sharply reducing the number of anomalies to provide a set of minutia candidates.

As with the phase one analysis technique, this phase two technique has a low rejection error in that it rejects few good minutia. However it has a fairly high acceptance error in that it passes a substantial amount of noise. But the acceptance error is substantially better than provided by the phase one rough screening technique.

NOISE REJECTION

A Third Phase of Processing

The third phase of processing is another simple technique which recognizes that the structure of a fingerprint includes noisy local areas and that elimination of everything in such an area as a minutia candidate will greatly reduce the amount of subsequent processing with minimal loss of useful information. In this noise rejection, quick-out technique a subfield of 21×23 pixels is erected around each minutia candidate that emerges from the phase two processing. The anomaly end point pixel C is the center of the 21×23 pixel subfield. A count is made of the number of phase one anomalies in the 21×23 pixel box. If that count is greater than some predetermined number, then every minutia candidate in that box, including the center candidate, is eliminated from further analysis. This provides a reduced set of minutia candidates.

The importance of this noise rejection, quick-out feature is a function of how effective is the optical filtering employed in providing the input image.

The predetermined number has been as high as twenty-nine in one embodiment and as low as twelve in another embodiment. A higher number is preferred to assure enrollment of as much of the population as possible. A lower number is preferable to speed up processing in verification. The optimum number is a partial function of the criteria used in the rest of the processing.

MINUTIA CANDIDATE PAIRING

A Fourth Phase of Processing FIGS. 5A–5I

Each minutia candidate that emerges from the phase three processing is subject to a substantially more detailed processing which involves analysis within the sub-field of 21×23 pixels erected around each minutia candidate. This box of 21-23 pixels provides a sufficient field so that a comparison can be made between the minutia candidate and other closely associated anomalies. Certain relationships can be identified which are known to indicate structures that are not classical minutia and thus, must be rejected as noise.

FIGS. 5A–5I and 6 represent in somewhat idealized and schematic form, the kinds of structural relationships which are identified in the phase four processing and which result in the elimination of minutia candidates to provide a set of minutia.

Roughly speaking, FIGS. 5A through 5D and FIG. 5G represent those bridge and crack type of situations in which the candidate minutia being tested (represented by an end point pixel C at the center of the box) is rejected because of its close proximinity to another anomaly. It should be noted that the minutia candidate at the center of the box is being compared with those anomalies identified in the first phase of processing. This close proximity indicates either a break in what is otherwise a continuous ridge line or a bridging over between two adjacent continuous ridge lines. Such breaks and bridges are unstable and thus constitute noise and cannot be usefully used to indicate or represent classical minutia.

By contrast, FIGS. 5E, 5F, 5H and 5I represent situations in which the minutia candidate (represented by its "end point" pixel C at the center of the box) is carried forward as a candidate even though there are nearby anomalies. The structural relationship between the center minutia candidate and the adjacent anomalies are such as to indicate that the adjacent anomalies arise out of cracks, bridges, ripples, holes, etc. which are substantially part of a continuing ridge line. Thus the adjacent anomalies are noise because they cannot be relied upon and thus are not classical minutia. But the center candidate minutia stands on its own as a likely minutia.

As an approximate general rule, it may be seen from the FIGS. 5E, 5F, 5H and 5I examples that where there are paired anomalies adjacent to the center pixel C, the center minutia candidate is not rejected. By contrast, as may be seen from the FIGS. 5A through 5D and 5G examples, the center minutia candidate is rejected where it is paired with another adjacent anomaly and that pairing indicates a break in what otherwise is a continuous ridge line or a bridge between what otherwise is a continuous ridge line.

Figure 5A:
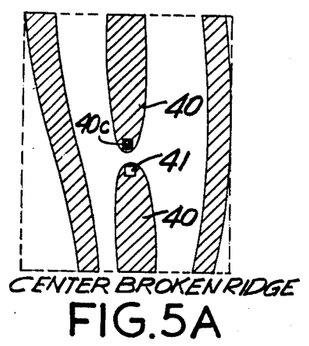
FIGS. 5A–5I represents nine minutia candidate situations in which closely situated paired anomalies are rejected (during a fourth phase of the analysis as minutia.
Figure 5B:
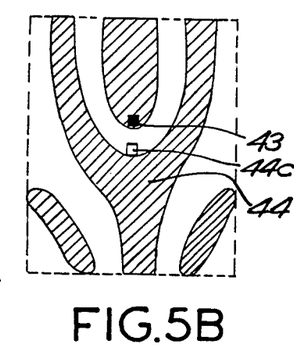
Figure 5C:
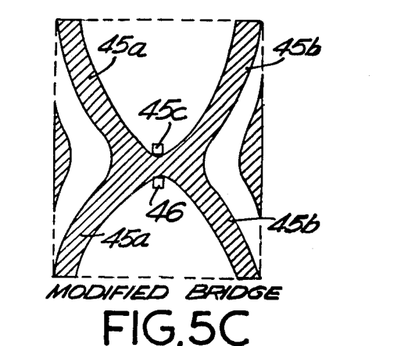
Figure 5D:
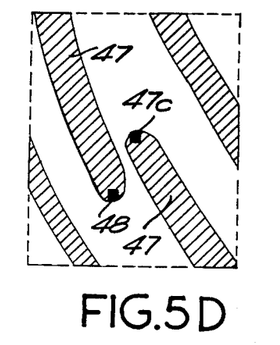

More specifically, in FIG. 5A, the break in the ridge 40 serves to generate the line ending minutia candidate represented by the end point pixel 40c. But, because of the immediately adjacent anomaly represented by the end point pixel 41, it is clear that these anomalies (represented by 40c and 41) do not represent line endings, but rather a break in the ridge 40. In FIG. 5B, the bifurcation minutia candidate represented by the pixel 44c is close to the line ending anomaly represented by the end point pixel 43. The proximity of the pair is such as to indicate that the minutia candidate 44 is not a bifurcation, but rather has been generated by an unstable break in what should be treated as a ridge continuity. FIG. 5C represents a situation in which two ridges 45a, 45b pass close to one another an in which a bridging over between them occurs. But, because the bridge is not sufficiently thick and long, it does not represent a stable configuration, thus is noise and cannot be treated as a minutia. The proximity of the anomaly pair represented by end point pixels 45c and 46 indicates that the minutia candidate 45 is not a stable minutia. The kind of break shown schematically in FIG. 5D is a variation on the one shown in FIG. 5A, in which the ridge line 47 has a break that is represented by two anomalies having end point pixels 47c and 48.

Figure 5E:
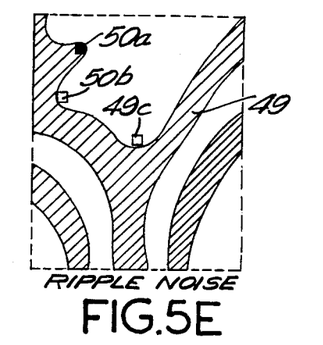
Figure 5F:
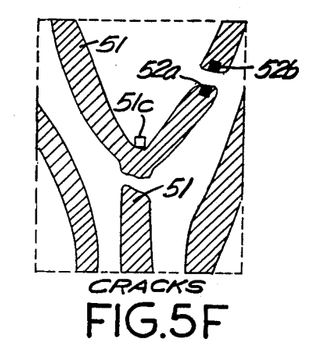

FIGS. 5E, 5F, 5H and 5I represent a number of different types of situations in which paired minutia candidates are observed displaced from the box center pixel C representing the minutia candidate under consideration. Because they are paired they do not result in the rejection of the center box minutia candidate. FIG. 5E illustrates a ripple situation (represented by the anomalies having end points 50a, 50b), where the ripple is displaced from the candidate bifurcation minutia 49. This simply represents the fact that a ridge line may have a ripple or wavy segment. The cracks in FIG. 5F represent spacings in the ridge line 51 which are sufficiently narrow so that they are likely to be unstable, and in any case do not detract from the overall ridge continuity.

A comparison of FIG. 5F and FIG. 5A may be somewhat instructive. Pixels 52a, 52b in FIG. 5F are analogous to the pixels 40 and 41 in FIG. 5A. In both cases they represent a crack, which is likely to be unstable, and which is certainly not typical of a classic line ending minutia. In the case of FIG. 5A, the result is the elimination of a minutia candidate because the end pixel 40c of that candidate is part of the pair. In FIG. 5F the bifurcation minutia candidate under consideration is not eliminated because it is not part of the pair. But the two anomalies represented by the pair 51a, 51b have been or will be eliminatd as minutia candidates.

Figure 5G:
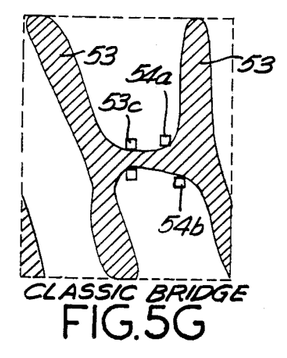

The classic bridge shown in FIG. 5G, represents an unstable bifurcation arrangement in which the ridge 53 bifurcation represented by the center pixel 53c is rejected as a minutia because of the closely located paired anomaly 53d. The existance of the pair of adjacent anomalies, represented by the end point pixels 54a and 54b do not override that indication of instability because elimination of the pair 54a, 54b still leaves the pair 53c, 53d. Thus the FIG. 5G situation is similar to the FIG. 5C modified bridge situation.

Figure 5H:
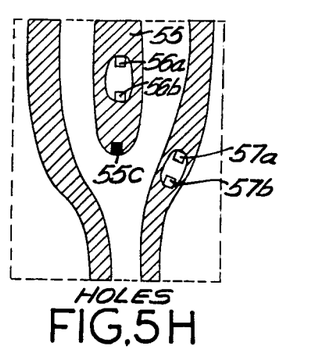

In FIG. 5H it is quite clear that the ridge 55 does have a line ending represented by the pixel 55c and that the adjacent paired anomalies 56a, 56b and 57a, 57b represent minor holes which should be disregarded in what is otherwise continuous ridge line structure.

Figure 5I:
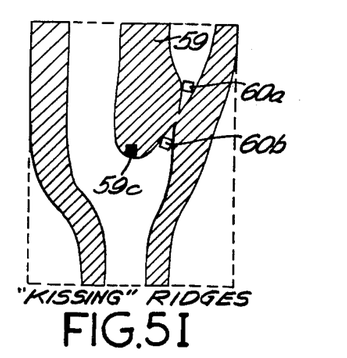

The kissing ridge situation shown in FIG. 5I and the modified bridge arrangement shown in FIG. 5C are substantially similar in that they both represent adjacent ridges which touch one another at one pont, normally an unstable configuration, but which certainly is not a classical minutia. However in FIG. 5I, the ridge 59 is a line ending represented by the pixel 59c. The adjacent paired anomalies represented by pixels 60a and 60b indicate that the instability is represented by the pair 60a and 60b and is not associated with the line ending 59c.

In all cases, positionally closely associated paired anomalies represent the fact that there is no minutia candidate associated with either member of the pair of anomalies. In each case, the paired rejected anomalies are not only close to one another but have either opposite curvatures or are of a different type. In FIGS. 5A through 5D and 5G this results in the elimination of the anomaly which is represented by the minutia candidate having the center pixel C because it is one of the paired anomalies. In the other four cases, the paired anomalies are displaced from the center pixel C and thus the corresponding minutia candidate is retained because it is not one of the paired anomalies.

Figure 6:
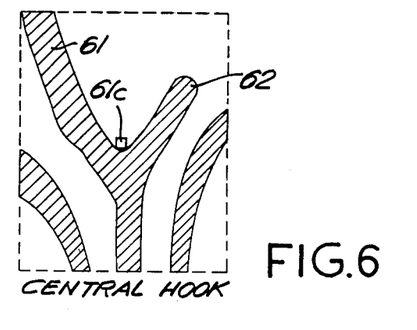
FIG. 6 represents a pairing situation which is an exception to the rule represented by the various FIG. 5 arrangements.

FIG. 6 represents a seeming exception in which the pairing of the anomalies represented by 61c and 62 does not result in an elimination of the minutia candidate 61C. The situation represented by FIG. 6 does not meet one of the pairing rules represented by FIGS. 5A through 5I.

FIGS. 5E, 5F, 5H and 5I represent the easiest generalized pairing rule to visualize. That rule is simply that when anomalies adjacent to the center anomaly (minutia candidate) are paired out so that only the center minutia candidate anomaly remains, that minutia candidate is passed on as a minutia.

FIGS. 5A, 5C and 5D represent a general rule where the paired anomalies include the minutia candidate anomaly. In that case, where the two are close, are of the same kind and have opposite curvatures, then they are deemed to represent a break in what is otherwise a continuum and the minutia candidate is dropped. FIG. 5G represents essentially the same situation after the pair 54a, 54b are eliminated.

In FIG. 5B the proximity of the anomalies 44c and 43 dictate their elimination. By contrast. the anomalies 61c and 62 in FIG. 6 are sufficiently spaced from one another so that they clearly do not represent a ripple and thus do not fall under any rule relating to the elimination of closely paired anomalies.

One additional preferred rule should be kept in mind which is not directly illustrated. The rule is: after all paired anomalies are eliminated, if there are two or more anomalies left in addition to the minutia candidate anomaly at the center, then the minutia candidate is dropped. FIG. 6 represents a situation where there is only one additional anomaly and thus is not eliminated under that rule.

ANGLE INDENTIFICATION THROUGH TEMPLATE MATCHING

Figure 7A:
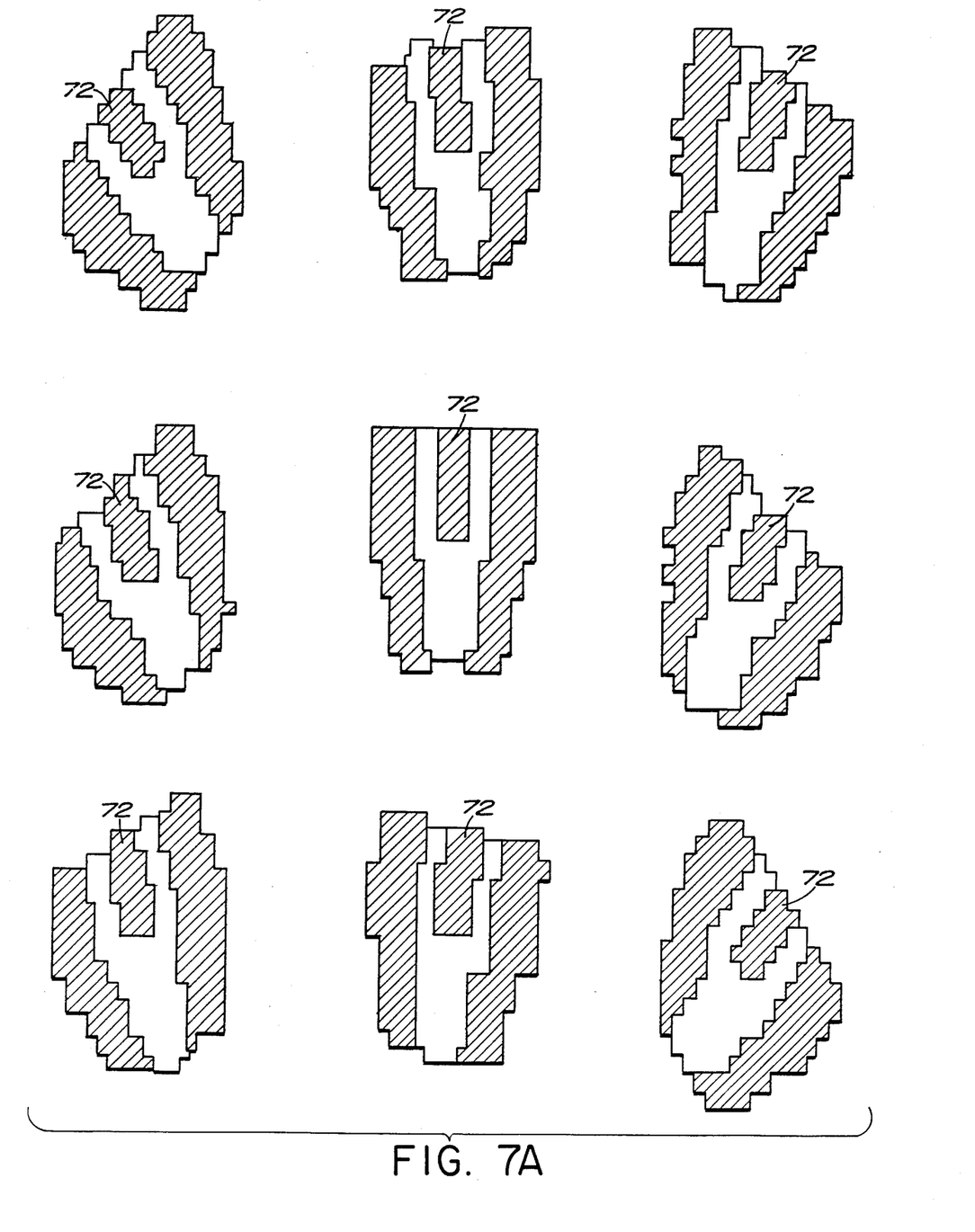
FIGS. 7A and 7B illustrate the templates employed to provide an identification of the angle at which the minutia is deployed in the field of the fingerprint.
Figure 7B:
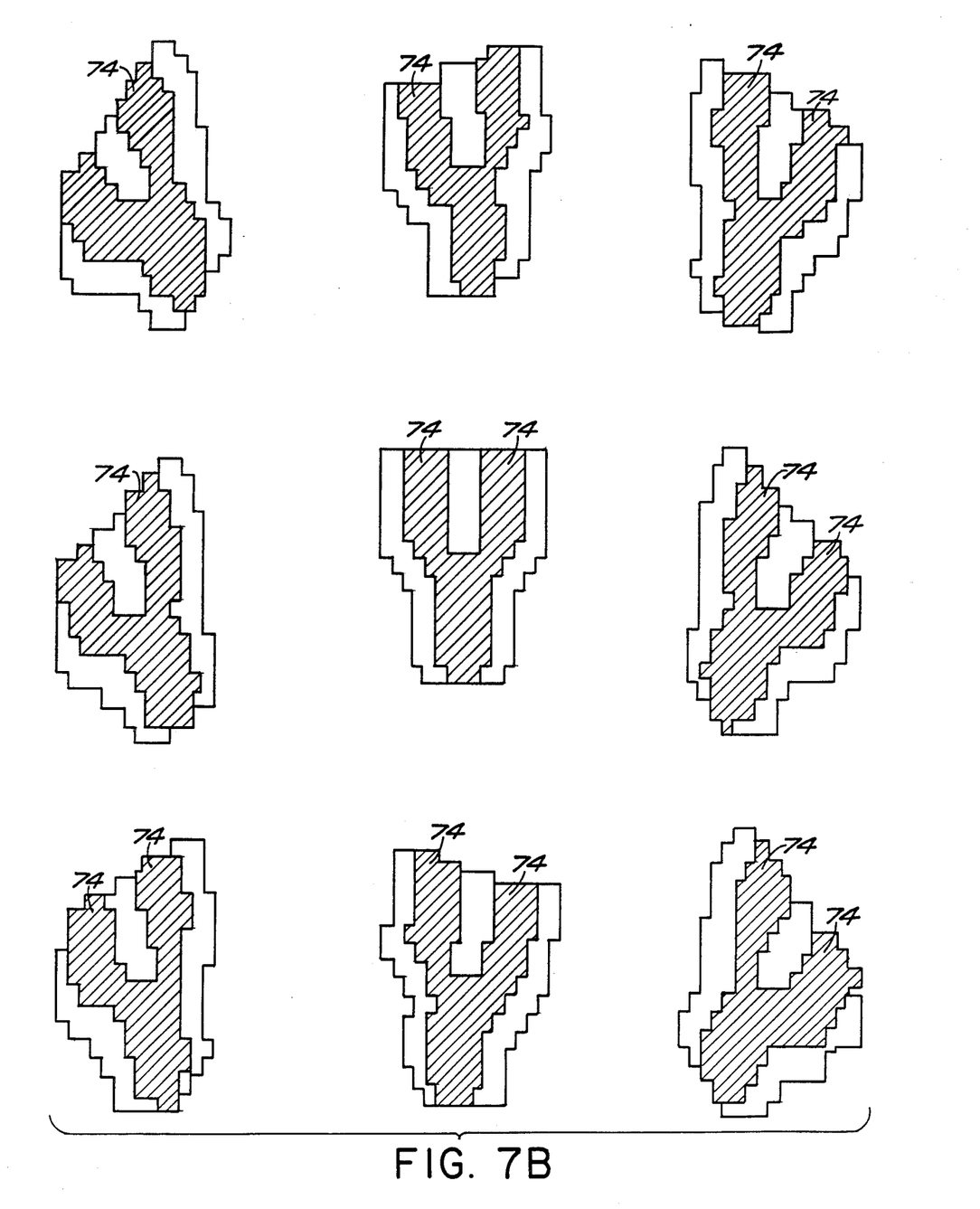

A Fifth Phase Of Processing (FIGS. 7A and 7B)

The minutia determined by the above steps have been identified in phase one as line ending or bifurcation minutia. An additional characteristic is their angle in the field. FIGS. 7A and 7B illustrate the set of nine line ending and nine bifurcation templates covering 90° of image angle, against which each minutia is correlated to provide an angle identification to within 11.25°.

In FIGS. 7A and 7B, as in all the FIGS. herein, the convention employed is to shade in those pixels which represent a ridge line under consideration. Obviously, in all of the FIGS. the value of the pixel could be reversed and the identical analysis made. Furthermore, as indicated earlier, the analysis can be either ridge analysis or valley analysis.

In FIG. 7A, the zones marked 72 each represent a ridge line ending minutia having a different angle in increments of 11.25°. In FIG. 7B, the zones 74 represent a ridge bifurcation minutia each having a different angle in increments of 11.25°. The eighteen templates shown in FIGS. 7A and 7B are supplemented by an additional eighteen templates identical in configuration except rotated 180° from those shown in the drawings. The input minutia derived from the "vertical" axis analysis in the earlier phases of processing are processed separately from the input minutia derived from the "horizontal" axis analysis throughout the enrollment and verification modes. The analysis along one axis is first completed and then the image is rotated to permit identical analysis along the other axis.

The input bifurcation or line ending minutia has to be normalized in thickness in order to use these FIG. 7 templates so that the templates will be equally effective with fingerprints where the ridges are relatively thick or relatively thin. In order to normalize the minutia classified by these FIGS. 7A and 7B templates, a skeletal ridge line is employed. The skeletal ridge line is achieved by reducing the ridge line to one pixel wide. The center of gravity of each horizontal row of pixels within a ridge line is employed. Thus if a ridge line is three, five, or any odd number of pixels wide, the center pixel is the one that is selected to represent the ridge at that point for the purpose of this FIGS. 7A and 7B template angular analysis. Where there is an even number of pixels, a consistent rule of choosing the pixel to the right of center may be employed. This skeletel minutia is then overlaid on each of the templates shown and the number of skeletal pixels which fall within the template zone 74 (where bifurcations are being tested) or the template zone 72 (where line endings are being tested) are counted. The minutia is then tagged with an angle that is determined by the template match where the maximum pixel count is obtained.

The normalization of the minutia substantially eliminates the uncertainty of FIGS. 7A and 7B template angle identification. However, this skeletal arrangement, which is provided to effect normalization, creates an enhanced sensitivity to positional changes. The movement of the skeletal minutia to the left or right by only a pixel or two can result in the difference between the minutia falling primarily within a given template or outside of that template. This sensitivity to position has to be recognized in connection with this routine for scanning the FIGS. 7A and 7B templates over the normalized minutia.

The preferred scan routine involves the following procedure on a template by template basis. First, the center of gravity of the template is caused to coincide with the center of gravity of the non-normalized minutia. The degree of correlation between the normalized (skeletal) minutia and the template so placed is determined. The template is then displaced (but not rotated) in increments of one pixel in various directions and the degree of correlation between the template and the skeletal minutia is determined for each displacement position. That position which provides the greatest correlation is deemed to be the correlation figure between that template and the minutia involved. The same routine is repeated for each template on each minutia under investigation. The template where the correlation is greatest is the one which is used to designate the angle of the minutia.

ESTABLISHING A FINAL REFERENCE FILE

A Sixth Phase Of Processing

The final reference file constitutes a subset of the minutia identified by the five stages of processing indicated above. A typical fingerprint may have forth to fifty fairly good repeatable classical minutia. Some poor quality fingerprints have less. Some fingerprints have more. However, a file reduction routine is undertaken which reduces the number of minutia in the reference file to approximately ten to fifteen minutia. One important consequence of this reduced set of reference file minutia is that the time required for the verification procedure is substantially reduced. To obtain this increased throughput, without increasing Type I or Type II identification errors, it is necessary to select the minutia to be kept in the final reference file according to certain procedures.

In brief, an initial reference file is established by going through the processing phases one through five set forth above. Then a set of multiple scan steps are undertaken as set forth below. After each scan, the minutia detected are compared against the initial reference file. A final reference file of minutia is established based on those minutia picked up most frequently during the multiple scans. More particularly, the following steps are taken.

A. Establish Initial Reference File

On a first scan of the input fingerprint, the result of processing phases one through five establishes an initial reference file of minutia. This initial file is the result of the first scan in the enrollment process. This initial reference file typically has forty to fifty minutia per axis although the number of minutia may occasionally be as high as one hundred and as low as twenty or even less.

In one embodiment, the number of minutia points per axis was arbitrarily set at fifty for the initial reference file.

B. Establish Preliminary Reference File

Those minutia selected for the preliminary reference file are those which appear in each of a predetermined number of subsequent scans. In one embodiment, it has been found useful to go through six additional processing routines on the input fingerprint and to maintain in the reference file only those minutia from the initial file which are identified in five of the six subsequent scans. Specifically, after the initial reference file has been established in accordance with the five phases of processing set forth above, the subject reapplies the finger to the platen an additional six times The processing phases one through five are undertaken each time the finger is reapplied to the platen. Those minutia from the initial reference file which fail to be identified a requisite number of times in these multiple verification scans are then dropped from the reference file. This provides a verification technique in enrollment to provide a purged or limited set of minutia. In this fashion, the most stable minutia are selected.

This multiple scan technique results in a reference file in which it is highly probable that each reference file minutia is a clearly identifiable classical type of minutia.

Figure 8:
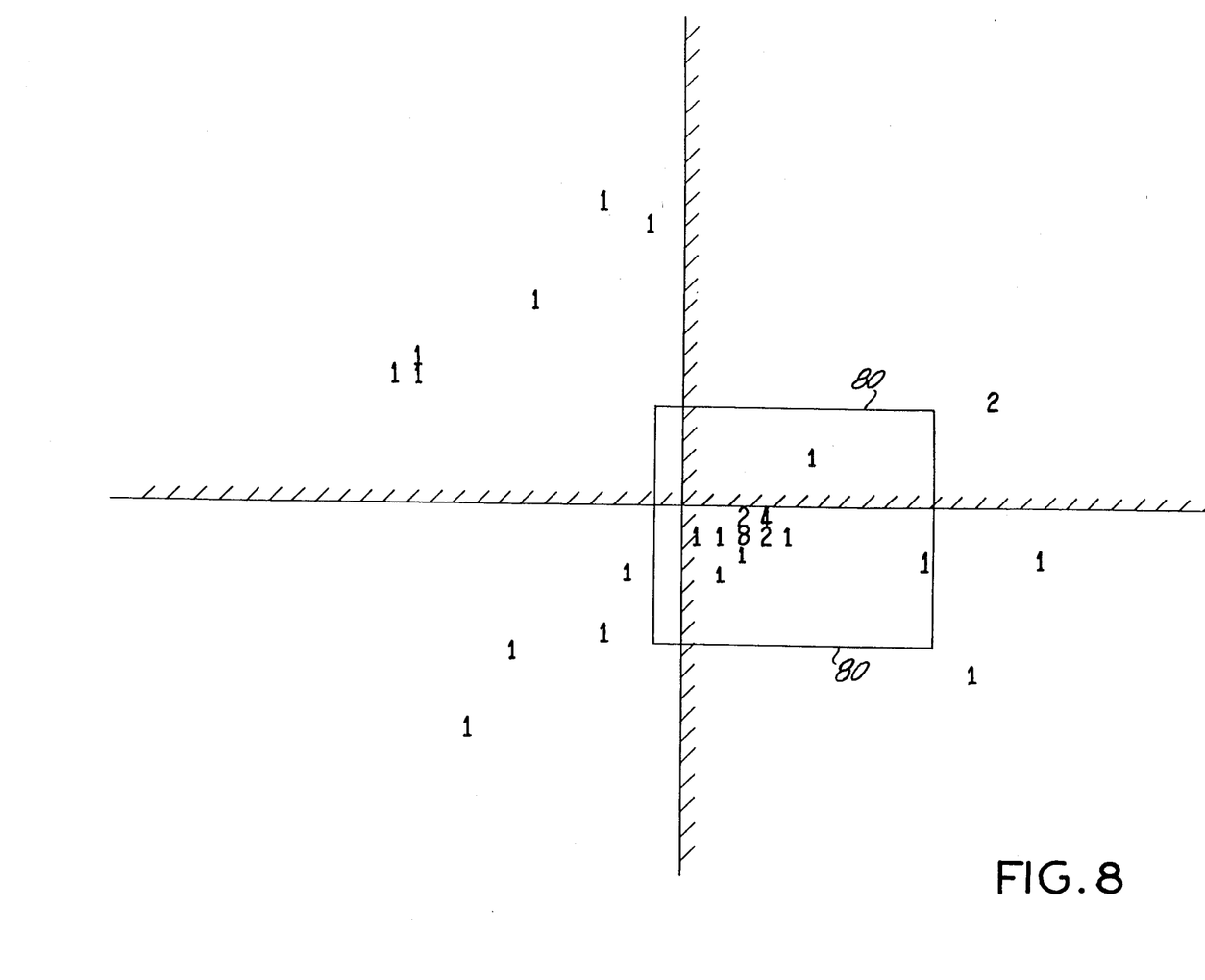
FIG. 8 represents a difference plane deployment of the type that is employed in determining correlation between the minutia determined during a scan of a subject fingerprint and the minutia in the reference file for that fingerprint.

During each of those scans two through seven, the following difference plane analysis is made to identify the minutia from the scan involved with corresponding minutia from the initial reference file. A 96×96 pixel box is erected around each of the minutia identified in the initial scan. Then in any one of the subsequent scans two through seven, each of the minutia identified in that subsequent scan is positionally correlated against the minutia from the initial scan which is at the center of the box. This positional correlation is between the end point pixel C of each of the subject minutia in the box and the end point pixel C of the reference minutia at the center of the box. FIG. 8 shows a possible difference plane.

More specifically, there are typically between forty and fifty minutia in the initial reference file. Within the 96×96 pixel box erected around each initial reference file minutia, there will usually be a few minutia of the scan under consideration. Each of these reference file minutia has an end point pixel C with position characteristic x and y. The subject minutia within each 96×96 box are compared with the reference file minutia at the center of the box. Specifically the algebraic difference between the x values of the two minutia being compared and the algebraic difference between the y values is plotted as a data point in an x, y difference plane such as shown in FIG. 8

It should be noted that not all the subject minutia within each 96×96 box are compared against the reference file minutia at the center of the box but only those subject minutia are compared where the angle of the subject minutia is plus or minus one of the thirty-two angular identification increments employed in the fifth phase of processing. All the data points developed from a comparison of the minutia from a given subsequent scan against the minutia from the initial scan are plotted on one difference plane.

Thus points in the difference plane are generated by taking each subject minutia within the 96×96 box that is within plus or minus one angular increment from the reference minutia point to the center of the box and comparing that subset of subject points against the center reference point to generate difference points on the difference plane. The difference plane is created by the addition of all the difference points from all the reference minutia centered boxes in a given scan.

The difference plane will show a cluster of difference points offset from the center. The reason why the cluster is offset is that on each successive input of a finger on the platen, there is likely to be a displacement of the fingerprint along both the x and y axis from that fingerprint's input location when establishing the initial reference file. That cluster represents those reference minutia/subject minutia comparisons in which the two minutia being compared are likely to be corresponding minutia.

To identify that cluster, a window of 16×16 pixels is scanned across the difference array to a position within which a maximum number of difference points occurs. A window 80 is shown in FIG. 8. Each point within the window is deemed to be a valid identification of the reference file minutia responsible for the point. For each of the scans two through seven, each valid identification is tallied against the corresponding reference file minutia.

More particularly, this cluster seeker window 80 is centered successively at each of the difference points in the plane. The difference point in the plane on which the window is centered when the window encompasses the greatest number of points need not necessarily be the location which has the greatest number of points. For example, in FIG. 8, the window 80 is centered on a difference plane location that is two spaces removed from the space in the plane where there are eight difference points located.

Each of the initial reference file minutia which is so identified in at least five of the six subsequent scans is retained in the preliminary reference file. All other minutia from the initial reference file are dropped.

There is a further limiting criteria of twenty minutia in the preliminary reference file. If over twenty minutia pass the five out of six recognition scan criteria, then only twenty are retained, giving priority to those with a recognition score of six. The minutia in excess of twenty are then arbitrarily dropped.

Typically this procedure reduces the number of minutia from the typical forty to fifty in the initial file (and in some cases as much as one hundred) to ten to twenty.

C. Establish Final Reference File

If the preliminary reference file established as set forth above has fewer than ten minutia, then it becomes a final reference file. However, if it has ten or more minutia, then the subject finger is subject to an additional three scans to establish the final reference file.

In particular, the preliminary reference file is used as the base file against which to compare the results of these additional three scans. Furthermore, in these additional three scans the relevant box within which to make the correlation for establishing the difference plane on each scan is 60×60 pixels rather than 96×96 pixels. Otherwise each of these scans eight through ten is processed in the same fashion as are the scans two through six.

Each of the preliminary reference file minutia which are identified in at least two of the three subsequent scans is retained for the final reference file. All other minutia from the preliminary reference file are dropped. Typically, this procedure provides a final reference file with 10 to 20 minutia with great assurance that the minutia are repeatable and stable minutia.

It should be noted that this additional screening or purging of the minutia by means of these additional scans eight through ten is undertaken only if the preliminary reference file has 10 or more minutia. If the preliminary reference file has fewer than 10 minutia that becomes a final reference file because of the need to have a certain number of minutia in a final reference file in order to provide reasonably high assurance that the verification routines for which this enrollment is intended will be effective.

A major purpose of having these enrollment scan routines in two sets, one being the scans two through seven and the other being the scans eight through ten, is in order to accommodate as wide a range of the population as possible while retaining low Type I and Type II errors. The enrollment verification scans two through seven operate on a comparison of subject points against reference points within a rather large 96×96 box. This assures the enrollment of the maximum number of individuals. The second set of enrollment verification scans eight through ten, cull down the reference file for the majority of people who have relatively large numbers of stable minutia so as to provide a final reference file in which verification is much more likely to occur in a first scan or at least on an early scan.

Repeat Phases One Through Six For Second Axis

After all the above has been completed for an input image, the image is rotated 90° and the above routine from phases one through six is repeated. This establishes a second set of up to twenty minutia for the final reference file.

If the final reference file developed from the processing along both axes has fewer than seven minutia, then it is rejected for enrollment and the entire enrollment process is started again for the individual involved.

Verification Mode

After an individual is enrolled, the system can then be used for verification of an input fingerprint against the final reference file for the individual for such purposes as use in an access control system. What has been described above as phases one through six is undertaken during the enrollment process.

Because the enrollment technique described above has provided an extremely stable and reduced set of minutia in the final reference file, the verification process can be quick.

In brief, in verification, the processing set forth above as phases one through five is executed. In addition, during verification a difference plane correlation is made in order to determine whether or not the input fingerprint does indeed correspond to the designated reference file of minutia. The data points for this correlation are determined as set forth above in connection with the scans eight through ten of the enrollment process. However, in verification, the reference file is only the minutia of the final reference file.

During verification, the process is completed along one axis through the difference plane correlation because if identification is made in that axis, then there is no need to go to the second axis analysis. It is only if the match is not made in one axis that it becomes necessary to make the analysis in the second axis. This substantially speeds up the average processing in the verification mode.

A preferred axis may be selected for the verification mode. This preferred axis is the axis which is processed first because it is the axis which is more likely to provide verification on the first verification scan.

The preferred axis is essentially that axis which, in enrollment has the highest average number of valid identifications made in the scans eight through ten. The purpose of this average number is to determine a preferred axis and the perferred axis is used only in verification. In validation these final reference minutia constitute the basic file. Thus only the points that end up in the final reference file are used to determine this average validation number.

Some of the points in the final reference file will have been included after having been validly identified in two out of the three scans and some will be there because they were validly identified in three out of the three scans. The number of valid identifications for all of the minutia points in the final reference file are added and an average is obtained by dividing through by the number of such minutia. This is done for both the vertical axis scan and the horizontal axis scan. Whichever has the highest average valid identification number is deemed to be the preferred scan. It should be noted that the preferred axis for the scan may be the axis that has the fewer minutia. For example if the vertical axis has ten minutia all of which are identified in each of the three scans and the horizontal axis has twelve minutia some of which are recognized in only two of the three additional scans, the vertical axis would be the preferred axis. The average validation number can range from 2.0 to 3.0.

If the preliminary reference file is used as the final reference file then the average validation number, perforce, is determined by the scans two through seven. In that case the average validation number per axis will be no less than 5.0 and no greater than 6.0.

Once the data points have been established, in the verification scan, a 16×16 pixel window is scanned across the difference plane to identify the maximum cluster of points on the plane. If the number of points in that cluster exceeds a certain level, then the subject fingerprint is deemed to be verified. In one embodiment that identification level is normally seventy percent of the minutia in the final reference file. However, if twelve or more of the minutia in the subject fingerprint match the final reference file, the identification is deemed made regardless of the percentage involved. Furthermore, in that embodiment, if there are five or fewer matches between the subject file and the reference file, then identification is negatived regardless of the percentage involved. Thus, for example, if an individual's reference file has a minimum number of seven minutia, access identification will require that the subject print match with at least six or seven of the reference file minutia.

A few of the reference file minutia may be represented in the maximum cluster by more than one point. It is preferable to treat such duplicate representations as a single count in determining the seventy percent matcher level, twelver minutia matcher level or five minutia matcher level.

There are many variations and modifications of the above routines that could be employed without departing from the scope of this invention.

For example, it has been found useful in reducing processing time in verification to incorporate a further screening routine prior to the noise rejection third phase of processing and immediately after the continuity testing, second phase of processing. This screening routine rejects all subject minutia candidates which are positioned more than a certain distance from any of the reference file minutia. A box of 60×60 pixels is erected around each of the minutia points in the final reference file. All subject points outside that set of boxes are discarded prior to the third phase of the processing. In the case of certain fingerprints, this reduces the processing time in verification. this is particularly useful for those individuals whose fingerprints have all the good minutia points in one area. In the embodiment where this additional screening routine is implemented, the 60×60 box is centered on the minutia points in the preliminary reference file during the scans eight through ten of enrollment so as to maintain the congruence between the verification process and the enrollment routine. In that embodiment this further screen is also employed in the enrollment scans two through seven except that the box is 96×96 pixels and it is centered on the initial scan minutia.

In addition, a number of the other numerical criteria or sub-field sizes or verification formulas can be modified as a tradeoff against one another to broaden the acceptance of this system to the entire range of possible fingerprints, to tighten up or to loosen up on either Type I or Type II errors and/or to reduce processing time in the verification mode.

It should be noted that FIG. 8 is only an example of the type of difference plane. It represents an output on a slightly different, and presently less preferred embodiment. Furthermore the window 80 used in the verification mode need not be the same as the window 80 used in enrollment.

What is claimed is:

1. In the machine method of identifying fingerprint minutia from a binary field of pixels having first and second binary signal values representing the fingerprint, the improvement comprising the steps of:

providing a set of binary value signals representing pixels of a fingerprint image generated from an optical scan of a fingerprint, scanning each of a predetermined set of anomaly templates across the field of said pixels represented by said set of signals, identifying as an anomaly each match of any one of said anomaly templates against a subfield of said pixels to provide a set of anomalies, each of said anomaly templates being of sufficient size to provide an indication of anomaly type, anomaly curvature and anomaly thickness, testing the zone of pixels of contrasting value around each of said identified anomalies for thickness uniformity, identifying as a minutia candidate those anomalies where the surrounding zone exhibits a uniformity of thickness in accordance with a predetermined criteria to provide a set of minutia candidates, erecting a predetermined window around each of said set of minutia candidates, identifying each of said anomalies in said window, comparing the relationship between the set of said anomalies in said window against a predetermined fingerprint noise characteristic to provide a determination of the presence of fingerprint noise, and rejecting the minutia candidate of said window where there has been a determination of fingerprint noise, to thereby provide a reduced set of minutia candidates.

2. The method of claim 1 further comprising the steps of:
establishing an analytical zone around each of said minutia candidates in said reduced set,
within each of said analytical zones comparing all anomalies except said minutia candidate to identify paired anomalies,
within said analytical zone, comparing said minutia candidate with each unpaired anomaly to identify any minutia candidate anomaly pair, and
eliminating from said reduced set of minutia candidates any of said minutia candidate anomaly pairs, to provide a set of minutia.

3. The method of claim 2 further comprising the steps of:
comparing each of a predetermined set of minutia angle identification templates against a representation of each of said set of minutia, each of said minutia angle identification templates incorporating the line ending and contrasting binary value bifurcation combination that defines a minutia,
correlating each of said angle identification templates to each minutia, and
assigning an angle to each minutia as a function of the template having the greatest correlation with the minutia involved.

4. The method of claim 1 wherein each member of said set of anomaly templates is at least three pixels by eight pixels.

5. The method of claim 1 wherein each of said anomaly templates is positioned over successive pixels so that overlapping subfields of said pixels are compared against a predetermined template to provide identification of anomalies.

6. The method of claim 1 wherein said step of testing comprises:
counting the distances from first and second predetermined points of each of said anomaly subfields in predetermined directions to predetermined transitions between the values in said field of pixels to provide first and second distance counts, and
comparing said first and second counts and eliminating from further consideration those anomalies wherein said comparison is past a predetermined threshold.

7. The method of claim 1 wherein said predetermined fingerprint noise characteristic is at least partially based on the number of anomalies in said window.

8. The method of claim 2 wherein said analytic zone and said window are the same.

9. The method of claim 3 wherein said normalized minutia is a skeletal minutia.

10. The method of claim 9 wherein said step of comparing includes a separate comparison of said angle indentification templates against said minutia at a plurality of laterally displaced positions for each of said angle identification templates.

11. The method of claim 3 wherein each of said set of anomaly templates is three pixels by eight pixels.

12. The method of claim 10 wherein each of said anomaly templates is positioned over successive pixels so that overlapping subfields of said pixels are compared against a predetermined template to provide identification of anomalies.

13. The method of claim 12 wherein said step of testing comprises:
counting the distances from first and second predetermined points of each of said anomaly subfields in predetermined directions to predetermined transitions between the values in said field of pixels to provide first and second distance counts, and
comparing said first and second counts and eliminating from further consideration those anomalies wherein said comparision is past a predetermined threshold.

14. The method of claim 13 wherein said predetermined fingerprint noise characteristic is at least partially based on the number of anomalies in the said window.

15. The method of claim 14 wherein said analytic zone and said window are the same.

16. The method of claim 15 wherein said normalized minutia is a skeletal minutia.

17. The method of claim 16 wherein said step of comparing includes a separate comparison of said angle identification templates against said minutia at a plurality of laterally displaced positions for each of said angle identification templates.

18. The machine method of enrolling a set of fingerprint minutia from a binary field of pixels having first and second binary signal values representing the fingerprint comprising the steps of:
generating an initial set of fingerprint minutia from an initial optical scan of a fingerprint to provide a field of minuţia,
identifying the angle within said field of each of said minutia by comparing each of a set of angle identification minutia templates against each of said minutia,
repeating said steps of generating and identifying on repeated applications of the fingerprint that is subject to the initial scan, to provide a separate set of minutia on each of said subsequent applications of the fingerprint,
erecting a predetermined subfield zone centered upon each of said minutia from said initial scan,
correlating the position of said initial scan minutia against each of said subsequent scan minutia within the corresponding subfield zone,
designating as a minutia for the subsequent scan involved only those minutia whose position corresponds within predetermined limits with the position of the initial scan minutia, and
retaining in a final enrollment file only those minutia which are identified in a predetermined number of said scans to provide a stable, limited enrollment file.

19. The method of claim 18 wherein said step of correlating is limited to those minutia having an angular correspondence within predetermined limits.

20. The method of claim 19 wherein said step of identifying the angle of said minutia employs a normalized representation of each of said minutia in skeletal form.

21. The method of claim 20 wherein said step of repeating provides a first plurality of sets of minutia and a second plurality of sets of minutia, the correlation criteria between each minutia in each of said second plurality of sets and minutia from said initial scan being substantially tighter than the correlation criteria in each of said first plurality of sets of minutia, said second plurality of sets of minutia being generated and identified only for fingerprints having more than a predetermined number of minutia.

22. The machine method of enrolling a set of fingerprint minutia from a binary field of pixels having first and second binary signal values representing the fingerprint and of verifying correspondence to a binary field of pixels generated from a subsequent application of the fingerprint, comprising the steps of:

generating an initial set of fingerprint minutia from an initial optical scan of a fingerprint to provide a field of minutia, repeatedly generating sets of fingerprint minutia from subsequent optical scans of repeated applications of the fingerprint that is subject to the initial scan, retaining in a final enrollment file only those minutia which are identified in a predetermined number of said scan to provide a stable, limited enrollment file, verifying the correspondence between minutia from a binary field of pixels representing a subsequent application of an input fingerprint and said minutia from said final enrollment file, said step of verifying employing analytical techniques and criteria substantially identical to those employed in said steps of repeatedly generating sets of minutia from repeated applications of the fingerprint during enrollment, whereby the biases in verification are matched by and at least partially compensated by the comparable biases in the repeated scans and repeated steps of generating minutia during enrollment.

23. The method of claim 22 wherein said step of repeatedly generating includes a first set of subsequent scans and a second set of subsequent scans, the correlation criteria between each minutia in each of said second set of scans and minutia from said initial scan being substantially tighter than the correlation criteria in each of said first set of scans, said second set of scans applying only to individuals having more than a predetermined number of minutia.

24. The method of claim 23 wherein said step of correlating is limited to those minutia having an angular correspondence within predetermined limits.

* * * * *